United States Patent [19]

Shiraishi et al.

[11] 4,307,216

[45] Dec. 22, 1981

[54] ADHESIVE COMPOSITION

[75] Inventors: Yoshihisa Shiraishi, Osaka; Kazuhiro Nakagawa, Suita; Chiaki Nakata, Ibaraki; Koiti Ohasi, Kitashinmachi, all of Japan

[73] Assignee: Sumitomo Chemical Company, Limited, Osaka, Japan

[21] Appl. No.: 111,820

[22] Filed: Jan. 14, 1980

[30] Foreign Application Priority Data

Jun. 29, 1979 [JP] Japan .................................. 54-83026

[51] Int. Cl.$^3$ .......................................... C08F 220/36

[52] U.S. Cl. ..................................... 526/298; 428/442; 428/463; 428/514; 428/522; 526/210; 526/212; 526/292.2

[58] Field of Search ............................... 526/298, 292

[56] References Cited

U.S. PATENT DOCUMENTS 3,559,652 2/1971 Banitt et al. .......................... 526/298
4,182,823 1/1980 Schoenberg ......................... 526/298

*Primary Examiner*—Harry Wong, Jr.

[57] ABSTRACT

An adhesive composition which comprises an α-cyanoacrylate compound with a certain ester ether compound and, preferably, a polyhydroxybenzoic acid compound. The composition is enhanced in heat shock resistance and improved in initial adhesion rate.

6 Claims, No Drawings

ADHESIVE COMPOSITION

The present invention relates to an adhesive composition. More particularly, it relates to an α-cyanoacrylate compound-containing adhesive composition enhanced in heat shock resistance. α-Cyanoacrylate esters are extremely polymerizable, and they are rapidly cured by the moisture at the surface of a solid material or in the atmosphere without using any catalyst or heating. Due to such characteristic property, α-cyanoacrylate esters are used as instantaneous adhesive agents for various materials such as rubbers, plastics, metals and glasses. Since, however, the cured resins resulting from α-cyanoacrylate ester-containing adhesive compositions are generally inferior in elasticity, those adhesive compositions are not suitable for bonding of the materials to which heat shock may be applied. Because of this reason, the improvement of the heat shock resistance so as to expand the field to which such adhesive compositions are usable has been highly demanded.

As the result of an extensive study, it has now been found that the incorporation of certain specific ester compounds into the adhesive compositions comprising α-cyanoacrylate esters can enhance the heat shock resistance without deterioration of the advantageous characteristic property inherent to the α-cyanoacrylate esters. It has also been found that the additional incorporation of certain specific polyhydroxybenzoic acids in such adhesive compositions can much more enhance the heat shock resistance. It has further been found that the said additional incorporation of the polyhydroxybenzoic acids is simultaneously effective in increasing the initial adhesion rate. This last effect is highly advantageous in making it possible to assure the firm adhesion of fibrous materials such as wooden plates.

According to the present invention, there is provided an adhesive composition which comprises an α-cyanoacrylate compound of the formula:

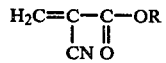

(I)

wherein R is a $C_1$–$C_{16}$ alkyl group (preferably a $C_1$–$C_4$ alkyl group) optionally having any substituent thereon (e.g. methyl, ethyl, n-propyl, isopropyl, n-butyl, isobutyl, secbutyl, octyl, ethylhexyl, dodecyl, benzyl, chloroethyl), an allyl group or a phenyl group, and an ester compound of the formula:

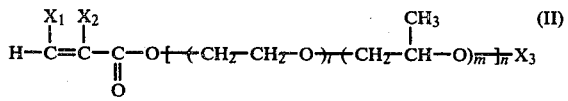

(II)

wherein $X_1$ is a hydrogen atom or a methyl group, $X_2$ is a hydrogen atom, a methyl group or a cyano group, $X_3$ is a hydrogen atom, —R′ or —OCR″ (in which R′ and R″ are each a $C_1$–$C_{18}$ hydrocarbon group not containing any anion polymerizable group) but when $X_2$ is a cyano group, $X_3$ is not a hydrogen atom, l and m are each zero or a positive integer but l + m is not zero and n is a positive integer. A typical example of the anion polymerizable group is an ethylenically unsaturated bond.

As the α-cyanoacrylate compound (I), there are known many compounds, among which the most preferred are lower alkyl α-cyanoacrylates, (e.g. methyl α-cyanoacrylate, ethyl α-cyanoacrylate, propyl α-cyanoacrylate).

Examples of the ester compound (II), which is also generally known, are monoacrylates, monomethacrylates or monocrotonates of glycols (e.g. ethylene glycol, diethylene glycol, triethylene glycol, tetraethylene glycol, polyethylene glycol, polypropylene glycol, oxyethylene oxypropylene block polymer), monoacrylates, monomethacrylates, monocrotonates or α-cyanoacrylates of glycol monoethers (e.g. methyl cellosolve, ethyl cellosolve, butyl cellosolve, methylcarbitol, tetraoxyethylene methyl ether, polyoxyethylene lauryl ether, polyoxyethylene nonylphenyl ether), acrylates, methacrylates, crotonates or α-cyanoacrylates of monoester compounds (e.g. polyoxyethylene monooleate, polyoxyethylene monostearate), etc. Among them, preferred are monoacrylates of glycol monoethers, particularly tetraoxyethylene methyl ether monoacrylate. Their molecular weights are usually not more than about 20,000.

In addition to the above essential components, the adhesive composition of the invention may comprise a polyhydroxybenzoic acid compound of the formula:

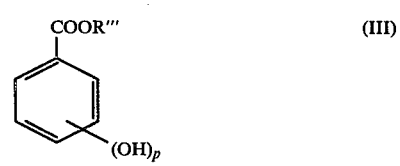

(III)

wherein R‴ is a hydrogen atom or a $C_1$–$C_{18}$ hydrocarbon group optionally having any substituent and p is an integer of 2 to 5. As R‴, hydrogen or lower alkyl is preferable. Specific examples of the polyhydroxybenzoic acid compound (III) are 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 3,4,5-trihydroxybenzoic acid, methyl 2,4-dihydroxybenzoate, ethyl 3,4-dihydroxybenzoate, methyl 3,4,5-trihydroxybenzoate, propyl 3,4,5-trihydroxybenzoate, lauryl 3,4,5-trihydroxybenzoate, stearyl 3,4,5-trihydroxybenzoate, methoxyethyl 3,4,5-trihydroxybenzoate, etc. Among them, the ones of the formula (III) wherein R‴ is lower alkyl (particularly propyl) and n is 3 are favorable. As stated hereinabove, the incorporation of the polyhydroxybenzoic acid compound (III) is effective not only for higher enhancement of the heat shock resistance but also for increase of the initial adhesion rate.

Moreover, the adhesive composition of the invention may comprise any other additive conventionally incorporated into an α-cyanoacrylate ester-containing adhesive composition. Examples of such additive are a stabilizer, a viscosity increasing agent, a plasticizer, a colorant, etc.

In the adhesive composition of the invention, the α-cyanoacrylate compound (I) is usually contained in an amount of not less than 50% by weight, preferably of not less than 80% by weight, based on the total weight of the adhesive composition. However, this is not limitative.

The amount of the ester compound (II) to be incorporated may be from 0.05 to 20% by weight based on the weight of the α-cyanoacrylate compound (I). When the amount is over the higher limit, the curing rate and the adhesive strength are unfavorably decreased to a considerable extent. Among the ester compound (II), the use of monoacrylate, monomethacrylates or monocrotonates of glycols shows a tendency of increasing the viscosity on the storage, for instance, at 70° C. for 5 days. Others do not show such tendency.

The polyhydroxybenzoic acid compound (III) is usually employed in an amount of 1 to 5000 ppm (by weight) to the α-cyanoacrylate compound (I).

The adhesive composition of the invention may be used for bonding of various materials. Particularly, it can assure a firm adhesion between the materials which have greatly different coefficients of linear expansion such as a plastic plate and a metal plate, a plastic plate and a glass plate or a wooden plate and a metal plate with an excellent heat shock resistance.

Practical and presently preferred embodiments of the present invention are illustratively shown in the following examples wherein % is by weight.

brought under a temperature of 20° C., and its tensile shear strength was measured with a rate of pulling of 50 mm/min.

The results are shown in Table 1, from which it is clearly understood that the incorporation of the ester compound (II) is effective in improvement of the heat shock resistance.

TABLE 1

|  | α-Cyanoacrylate compound (I) | Polyalkyl ether compound (II) | Amount added*1 (%) | Materials bonded*2 | Tensile shear strength (kg/cm²) | Remarks*3 |
| --- | --- | --- | --- | --- | --- | --- |
| Example 1 | Ethyl α-cyanoacrylate | Tetraethyleneglycol monoacrylate | 10 | PMMA/Steel | 35 | |
| Example 2 | Ethyl α-cyanoacrylate | Octaethyleneglycol monomethacrylate | 10 | PMMA/Steel | 39 | |
| Example 3 | Ethyl α-cyanoacrylate | Polyethyleneglycol monocrotonate | 10 | PMMA/Steel | 39 | |
| Example 4 | Ethyl α-cyanoacrylate | Pentapropyleneglycol monomethacrylate | 10 | PMMA/Steel | 42 | |
| Example 5 | Ethyl α-cyanoacrylate | Pentapropyleneglycol monomethacrylate | 10 | PMMA/Glass | 30 | |
| Example 6 | Ethyl α-cyanoacrylate | Tetraoxyethylene methylether acrylate | 10 | PMMA/Steel | 42 | |
| Example 7 | Ethyl α-cyanoacrylate | Tetraoxyethylene methylether acrylate | 10 | PMMA/Steel | 45 | containing 5% of PMMA |
| Example 8 | Ethyl α-cyanoacrylate | Tetraoxyethylene laurylether crotonate | 10 | PMMA/Steel | 33 | |
| Example 9 | Ethyl α-cyanoacrylate | Tetraoxyethylene laurylether crotonate | 20 | Lauan/Steel | 40 | |
| Example 10 | Methyl α-cyanoacrylate | Tetraoxyethylene laurylether crotonate | 10 | PMMA/Steel | 26 | |
| Example 11 | Ethyl α-cyanoacrylate | Polyoxyethylene monooleate cyanoacrylate | 10 | PMMA/Steel | 31 | |
| Comparative Example 1 | Ethyl α-cyanoacrylate | — | — | PMMA/Steel | 0 | |
| Comparative Example 2 | Ethyl α-cyanoacrylate | — | — | PMMA/Steel | 2 | containing 5% of PMMA |
| Comparative Example 3 | Methyl α-cyanoacrylate | — | — | PMMA/Steel | 0 | |

Note:
*1 Based on the weight of the α-cyanoacrylate compound (I).
*2 PMMA, polymethyl methacrylate.
*3 PMMA, polymethyl methacrylate.

EXAMPLES 1 to 11 and COMPARATIVE EXAMPLES 1 to 3

The α-cyanoacrylate compound (I) as shown in Table 1 was incorporated with sulfur dioxide gas as a polymerization inhibitor and hydroquinone as a stabilizer to make the respective contents of 0.002% and 0.1% based on the weight of the α-cyanoacrylate compound (I). The resultant mixture was used as an adhesive composition as such or after incorporation with the ester compound (II) as shown in Table 1.

Using the adhesive composition, the materials (100×25×1.6−3 mm) as shown in Table 1 were bonded each other with an adhesive area of 25×12.5 mm and cured at 20° C. under a relative humidity of 60% for 24 hours. In all the cases, the adhesion was completed within 45 seconds.

The bonded product was allowed to stand in a freezer at −20° C. for 3 hours and then in an oven at 60° C. for 3 hours. Taking this operation as one cycle, 10 cycles were repeated. Thereafter, the bonded product was

EXAMPLES 12 to 30 and COMPARATIVE EXAMPLES 4 to 6

The α-cyanoacrylate compound (I) as shown in Table 2 was incorporated with sulfur dioxide gas as a polymerization inhibitor and hydroquinone as a stabilizer to make the respective contents of 0.002% and 0.1% based on the weight of the α-cyanoacrylate compound (I). The resultant mixture was used as an adhesive composition as such or after incorporation with the ester ether compound (II) and/or the polyhydroxybenzoic acid compound (III) as shown in Table 2.

Using the adhesive composition, the materials (100×25×1.6−3 mm) as shown in Table 2 were bonded each other with an adhesive area of 25×12.5 mm and cured at room temperature for 5 minutes. The bonded product was subjected to measurement of tensile shear strength with a rate of pulling of 50 mm/min. Separately, curing was effected at 20° C. under a relative humidity of 60% for 24 hours. The bonded product was allowed to stand in a freezer at −20° C. for 3 hours and then in an oven at 60° C. for 3 hours. Taking this operation as one cycle, 10 cycles were repeated. Thereafter, the bonded product was brought under a temperature of 20° C., and its tensile shear strength was measured with a rate of pulling of 50 mm/min.

The results are shown in Table 2, wherein the results in Examples 6, 8 and 11 and Comparative Example 1 are also shown for comparison. From these results, it may be well understood that the combined use of the ester compound (II) with the polyhydroxybenzoic acid compound (III) produces remarkable improvment of the heat shock resistance affording an excellent initial adhesion rate.

TABLE 2

| | α-Cyano-acrylate compound (I) | Polyalkyl ether compound (II) | Amount added*1 (%) | Polyhydroxybenzoic acid (III) | Amount added*2 (%) | Materials bonded*3 | Tensile shear strength (kg/cm²) After 5 min. | Tensile shear strength (kg/cm²) After heat shock | Remarks*4 |
|---|---|---|---|---|---|---|---|---|---|
| Example 6 | Ethyl α-cyanoacrylate | Tetraoxyethylene methylether acrylate | 10 | — | 0 | PMMA/Steel | 20 | 42 | |
| Example 12 | Ethyl α-cyanoacrylate | Tetraoxyethylene methylether acrylate | 10 | — | 0 | Lauan/Steel | 25 | 39 | |
| Example 13 | Ethyl α-cyanoacrylate | Tetraoxyethylene methylether acrylate | 10 | Ethyl 3,4-dihydroxybenzoate | 0.02 | PMMA/Steel | 43 | 53 | |
| Example 14 | Ethyl α-cyanoacrylate | Tetraoxyethylene methylether acrylate | 10 | Ethyl 3,4-dihydroxybenzoate | 0.02 | Lauan/Steel | 45 | 60 | |
| Example 15 | Ethyl α-cyanoacrylate | Tetraoxyethylene methylether acrylate | 10 | Propyl 3,4,5-trihydroxybenzoate | 0.02 | PMMA/Steel | 32 | 52 | |
| Example 16 | Ethyl α-cyanoacrylate | Tetraoxyethylene methylether acrylate | 10 | Propyl 3,4,5-trihydroxybenzoate | 0.02 | Lauan/Steel | 39 | 51 | |
| Example 17 | Ethyl α-cyanoacrylate | Tetraoxyethylene methylether acrylate | 10 | Lauryl 3,4,5-trihydroxybenzoate | 0.02 | PMMA/Steel | 45 | 57 | |
| Example 18 | Ethyl α-cyanoacrylate | Tetraoxyethylene methylether acrylate | 10 | Lauryl 3,4,5-trihydroxybenzoate | 0.02 | Lauan/Steel | 52 | 60 | |
| Example 19 | Propyl α-cyanoacrylate | Tetraoxyethylene methylether acrylate | 10 | Lauryl 3,4,5-trihydroxybenzoate | 0.02 | PMMA/Steel | 46 | 51 | |
| Example 20 | Propyl α-cyanoacrylate | Tetraoxyethylene methylether acrylate | 10 | Lauryl 3,4,5-trihydroxybenzoate | 0.02 | Lauan/Steel | 44 | 50 | |
| Example 8 | Ethyl α-cyanoacrylate | Tetraoxyethylene laurylether crotonate | 10 | — | 0 | PMMA/Steel | 20 | 33 | |
| Example 21 | Ethyl α-cyanoacrylate | Tetraoxyethylene laurylether crotonate | 10 | — | 0 | Lauan/Steel | 24 | 40 | |
| Example 22 | Ethyl α-cyanoacrylate | Tetraethylene laurylether crotonate | 10 | Lauryl 3,4-dihydroxybenzoate | 0.02 | Lauan/Steel | 40 | 50 | |
| Example 23 | Ethyl α-cyanoacrylate | Tetraoxyethylene laurylether crotonate | 10 | Lauryl 3,4-dihydroxybenzoate | 0.02 | Lauan/Steel | 49 | 61 | containing 5% of PMMA |
| Example 24 | Ethyl α-cyanoacrylate | Tetraoxyethylene laurylether crotonate | 10 | Ethyl 3,4,5-trihydroxybenzoate | 0.02 | Lauan/Steel | 43 | 52 | |
| Example 25 | Ethyl α-cyanoacrylate | Tetraoxyethylene laurylether crotonate | 10 | Ethyl 3,4,5-trihydroxybenzoate | 0.02 | Lauan/Lauan | 40 | 65 | |
| Example 26 | Ethyl α-cyanoacrylate | Tetraoxyethylene laurylether crotonate | 10 | Methoxyethyl 3,4,5-trihydroxybenzoate | 0.02 | Lauan/Steel | 42 | 55 | |
| Example 27 | Ethyl α-cyanoacrylate | Tetraoxyethylene laurylether crotonate | 10 | Methoxyethyl 3,4,5-trihydroxybenzoate | 0.02 | Lauan/Steel | 40 | 60 | containing 5% of PMMA |
| Example 11 | Ethyl α-cyanoacrylate | Polyoxyethylene monooleate cyanoacrylate | 10 | — | 0 | PMMA/Steel | 18 | 31 | |
| Example 28 | Ethyl α-cyanoacrylate | Polyoxyethylene monooleate cyanoacrylate | 10 | — | 0 | Lauan/Steel | 24 | 38 | |
| Example 29 | Ethyl α-cyanoacrylate | Polyoxyethylene monooleate cyanoacrylate | 10 | Tetrahydrofurfuryl 3,4,5-trihydroxybenzoate | 0.05 | Lauan/Steel | 42 | 52 | |
| Example 30 | Ethyl α-cyanoacrylate | Polyoxyethlene monooleate cyanoacrylate | 10 | Tetrahydrofurfuryl 3,4,5-trihydroxybenzoate | 0.05 | Lauan/Steel | 46 | 54 | containing 5% of PMMA |
| Comparative Example 1 | Ethyl α-cyanoacrylate | — | 0 | — | 0 | PMMA/Steel | 8 | 0 | |
| Comparative Example 4 | Ethyl α-cyanoacrylate | — | 0 | — | 0 | Lauan/Steel | 2 | 2 | |
| Comparative Example 5 | ethyl α-cyanoacrylate | — | 0 | — | 0 | Lauan/Steel | 2 | 4 | containing 5% of PMMA |
| Comparative Example 6 | Ethyl α-cyanoacrylate | — | 0 | Propyl 3,4,5-trihydroxybenzoate | 0.05 | Lauan/Steel | 2 | 5 | |

Note:
*1 Based on the weight of the α-cyanoacrylate compound (I).
*2 Based on the weight of the α-cyanoacrylate compound (I).
*3 PMMA, polymethyl methacrylate.
*4 PMMA, polymethyl methacrylate.

What is claimed is:

1. An adhesive composition which comprises: not less than 50% by weight based on the weight of the composition of an α-cyanoacrylate compound of the formula:

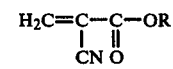

wherein R is a $C_1$-$C_{16}$ alkyl group optionally having a phenyl group or a chlorine atom substituent thereon, an allyl group or a phenyl group; and 0.05 to 20% by weight based on the weight of the α-cyanoacrylate compound (I) of an ester compound of the formula:

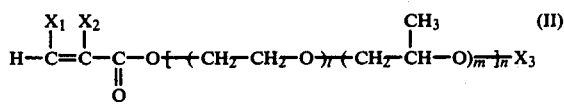

having a molecular weight of not more than 20,000, wherein $X_1$ is a hydrogen atom or a methyl group, $X_2$ is a hydrogen atom, a methyl group or a cyano group, $X_3$ is a hydrogen atom, —R' or —OCR" (in which R' and R" are each a $C_1$-$C_{18}$ hydrocarbon group not containing any anion polymerizable group) but when $X_2$ is a cyano group, $X_3$ is not a hydrogen atom, l and m are each zero or a positive integer but l+m is not zero and n is a positive integer.

2. The composition according to claim 1, wherein the α-cyanoacrylate compound (I) is a lower alkyl α-cyanoacrylate.

3. The composition according to claim 1, wherein the ester compound (II) is a monoacrylate of a glycol monoether.

4. The composition according to claim 1, which comprises additionally a polyhydroxybenzoic acid compound of the formula:

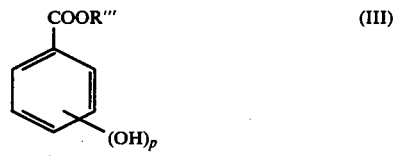

wherein R''' is a hydrogen atom or a $C_1$-$C_{18}$ group optionally having a methoxy group substituent and p is an integer of 2 to 5.

5. The composition according to claim 4, wherein the polyhydroxybenzoic acid compound (III) is the one wherein R''' is lower alkyl and p is 3.

6. The composition according to claim 4, wherein the content of the polyhydroxybenzoic acid compound (III) is 1 to 5,000 ppm to the weight of the α-cyanoacrylate compound (I).

* * * * *

UNITED STATES PATENT AND TRADEMARK OFFICE
CERTIFICATE OF CORRECTION

PATENT NO. : 4,307,216
DATED : Dec. 22, 1981
INVENTOR(S) : Shiraishi et al.

It is certified that error appears in the above—identified patent and that said Letters Patent is hereby corrected as shown below:

On the title page,

In the category "[73] Assignee:" change "Sumitomo Chemical Company, Limited, Osaka, Japan" to --Sumitomo Chemical Company, Limited, Osaka, Japan and Taoka Chemical Co., Ltd., Osaka, Japan--

*Signed and Sealed this*

*Eleventh* Day of *May 1982*

[SEAL]

*Attest:*

*Attesting Officer*

GERALD J. MOSSINGHOFF
*Commissioner of Patents and Trademarks*